United States Patent [19]

Gregorian et al.

[11] 4,035,532

[45] July 12, 1977

[54] TRANSFER FLOCKING AND LAMINATES OBTAINED THEREFROM

[75] Inventors: Razmic S. Gregorian, Aiken, S.C.; Hans R. Hoernle, Augusta, Ga.

[73] Assignee: United Merchants and Manufacturers, Inc., New York, N.Y.

[21] Appl. No.: 630,799

[22] Filed: Nov. 11, 1975

[51] Int. Cl.[2] .................... B05D 1/14; B05D 1/16; B32B 33/00

[52] U.S. Cl. .............................. 428/90; 156/68; 156/72; 156/230; 156/237; 156/276; 156/279; 156/344; 427/146; 427/154; 427/156; 427/200; 427/203; 427/206; 427/331; 428/86; 428/87; 428/95; 428/96; 428/97; 428/119; 428/120; 428/198; 428/246; 428/253

[58] Field of Search ................. 428/86, 87, 90, 95, 428/96, 97, 198, 246, 253, 119, 120; 427/200, 206, 146, 154, 156, 203, 331; 156/68, 72, 230, 237, 276, 279, 344

[56] References Cited

U.S. PATENT DOCUMENTS

| | | | |
|---|---|---|---|
| 2,135,901 | 11/1938 | Lea | 428/90 |
| 3,684,637 | 8/1972 | Anderson | 428/90 |
| 3,837,946 | 9/1974 | Gribbin | 428/86 |

*Primary Examiner*—Marion E. McCamish
*Attorney, Agent, or Firm*—Michael A. Caputo; John P. McGann

[57] ABSTRACT

A process for producing a flocked fabric laminate by coating an auxiliary substrate with a temporary adhesive binder, flocking the coated auxiliary substrate with flock fibers, coating the flock fibers with a curable flock adhesive binder, marrying a substrate backing layer to the binder coated flock, permanently setting the flock adhesive binder, and then removing the auxiliary substrate from the fabric laminate whereby the flock remains secured to the substrate backing layer is disclosed. Flocked fabric laminates obtained by such method are also described.

14 Claims, 2 Drawing Figures

TRANSFER FLOCKING AND LAMINATES OBTAINED THEREFROM

BACKGROUND OF THE INVENTION

1. Field of the Invention

This invention pertains to the field of flocked fabrics. More particularly, this invention pertains to flocked fabrics having a substrate backing layer which is impractical or impossible to nap or flock.

2. Description of the Prior Art

Textile fabrics comprising laminates of raised fibers, such as, a flock or pile, secured to a base or substrate material and methods for preparing the same have been known to the art for some time.

Fabrics which are inherently porous or dimensionally unstable, e.g., knits or coarsely woven material, and the like, have heretofore not been generally used as the backing or substrate layer in the type of laminate mentioned above. Such fabrics, due to their dimensional instability, cannot effectively be flocked without also destroying the fabric and/or creating a very boardy hand.

Further, these fabrics do not lend themselves to napping as a substitute for flocking, for it is extremely difficult if not impossible, to nap such a fabric without also destroying it.

Finally, flocked fabrics made in the conventional manner generally comprise three layers, a substrate backing layer, an adhesive interlayer, and a facing layer of flocked fibers. Because of the nature of the adhesive interlayer, i.e., the adhesive used spreads over the substrate backing layer in a continuous film, this layer constitutes essentially a gas or moisture impermeable barrier, thereby not allowing the fabric to "breathe".

SUMMARY OF THE INVENTION

Applicants have discovered a new type of flocked fabric and a method for making the same. In particular, applicants have discovered a method for flocking relatively sheer, woven, non-woven, or knitted fabrics, i.e., loosely interlaced fabrics, while avoiding the dimensional stability problems normally associated with such materials. Additionally, the fabric produced by this method may be made to possess permeability to air and moisture, if desired.

The flocked fabric of the present invention is prepared by first coating an auxiliary substrate with a temporary adhesive binder and thereafter flocking the thus coated auxiliary substrate. Subsequently, the flock fibers are coated with a curable flock adhesive binder. A substrate backing layer is then married to the binder coated flock. Thereafter, the curable adhesive is permanently set and the auxiliary substrate is removed whereby the flock remains secured to the substrate backing layer.

Applicants have also found that the fabric produced by the above described method can also be made to possess breathability by substantially applying the curable flock adhesive binder only to the tips of the flock fibers which have been flocked in a substantially upstanding position. The product obtained by such method comprises a substrate backing layer, a facing layer of flock fibers, and an adhesive binder interlayer securing the flock fibers to the substrate wherein a major portion of the binder is present substantially at the tips of the flock fibers and at the corresponding point of contact on the substrate layer to which the flock fibers are secured.

Alternatively, breathability can also be imparted to the fabric by coating the flock fibers with a foamed curable adhesive binder. In this instance, it is not necessary that the foamed adhesive be coated solely onto the tips of the flock fibers inasmuch as the inherent porosity of the foamed adhesive allows for the breathability of the final fabric.

DESCRIPTION OF THE PREFERRED EMBODIMENT

Figure 1:
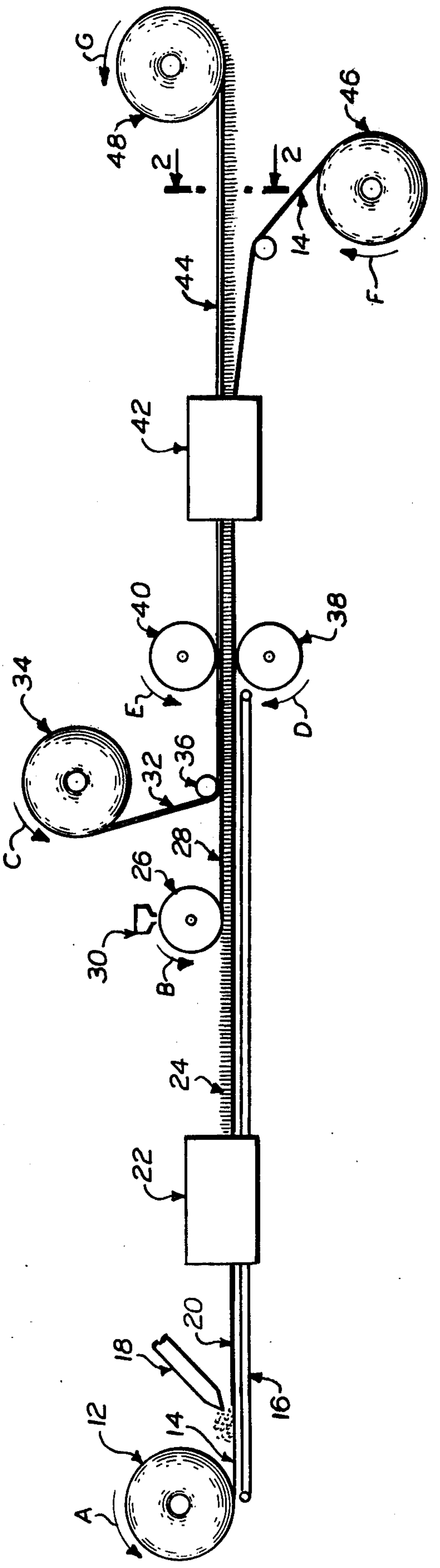
FIG. 1, is a schematic diagram of the process of the present invention.

Referring to FIG. 1, the process of the present invention may generally be carried out as follows:

A roll 12 of an auxiliary substrate 14 is unwound in the direction indicated by arrow A and is carried by conveyor 16 sequentially under a coating knife 18, which applies a continuous layer of a temporary adhesive binder 20 to the auxiliary substrate and a flocking box 22 where flock 24 is applied to the coated auxiliary substrate.

Upon leaving flocking box 22, the combination auxiliary substrate 14, temporary adhesive binder 20, and flock 24 is carried under a kiss roll 26 which rotates in the direction shown by arrow B to lay down a thin coating of a curable flock adhesive binder 28 from a trough 30. A substrate backing layer 32 fed from a roll 34, rotating in the direction shown by arrow C, is then brought into contact with the adhesive binder 28 by the action of positioning roll 36. A pair of squeeze rolls, 38 and 40, driven in the direction indicated by arrows D and E, respectively, then marry the substrate backing layer 32 to the adhesive coated flock.

The adhesive 28 is then cured in curing box 42, the auxiliary substrate 14 is stripped from the completed fabric laminate 44 and wound in the direction indicated by arrow F on roll 46. The completed fabric laminate 44 is simultaneously wound on roll 48 in the direction indicated by arrow G.

Referring now in greater detail to the process and components shown in FIG. 1, the auxiliary substrate 14 may be any type of material which is suitable for use on a temporary basis and which is relatively inexpensive inasmuch as it usually may only be used once and then disposed of. Typically, auxiliary substrate 14 may be paper, plastic, fabric, metallic foil, etc. Other auxiliary substrates, e.g., a back cloth, a "back grey" as used in roller printing, etc., which are suitable for reuse can also be used. It is important, however, that auxiliary substrate 14 be capable of withstanding the various flocking and heating treatments used in the present process.

The temporary adhesive binder 20, which is coated onto the auxiliary substrate 14, may be any type of flock binder known to the art which is suitable for binding the flock to the auxiliary substrate on a temporary basis. Typically, such a binder material would be an adhesive composition or one which possesses minimal adhesive properties. Thus, for example, it is possible merely to use a wax diluted or dissolved in a suitable solvent such that it can be applied in a thin film to the auxiliary substrate. The wax merely serves to retain flock on the auxiliary substrate in a relatively loose form, but to hold it sufficiently such that it is not blown off in the flocking box.

As used herein, the term "temporary adhesive binder" means a composition which when subjected to the usual curing conditions, e.g., heat, ultra-violet, etc., will not permanently set or permanently adhere to the substrate.

Also, typical of such compositions are low molecular weight polyethylene, polystyrene and the like. Additionally, starched based adhesives, such as, canary dextron and British Gum; gums, such as gum arabic and gum tragacanth; water soluble, non-curing polymers, such as, the polyvinyl alcohols, particularly hydrolyzed polyvinyl acetate, etc. may also be used. Another example of such composition is glycerine and urea.

As shown in FIG. 1, temporary adhesive 20 is applied to the auxiliary substrate by means of a knife 18. Alternatively, the adhesive may be applied with a roll, stipple roller, spray or other conventional methods well known in the art.

After application of the temporary adhesive binder, the coated auxiliary substrate is carried by conveyor 16 through flocking box 22. Flocking box 22 may be any type conventionally used in the art, such as, the beater bar type or an electrostatic flocking unit. The production of flock fabrics by such methods is well known in the art (see for example U.S. Pat. No. 3,079,212 incorporated herein by reference).

Generally, the flock 24 can be deposited onto the coated auxiliary substrate in any manner desired, however, where it is desired to produce a fabric which possesses permeability to air and moisture, it is preferable to flock the coated substrate such that the flock fibers are oriented in a substantially upright position and in a uniform manner across the coated substrate.

Suitable materials for use as flock fiber include rayon, cotton, nylon, polyesters, wool, mohair, silk, acrylics, modacrylics, natural and synthetic fibers, blends thereof, and the like. Such flock normally consists of fibers or filamentry materials, generally less than ¼ inch in length, although flock of greater length is known and can be used.

The auxiliary substrate, with the temporary adhesive thereon, is conveyed through the flocking step at a speed generally within the range used in commercial flocking processes, e.g., 25 to 100 feet/minute.

After exiting flocking box 22, the flocked auxiliary substrate is conveyed past kiss roll 26 which is supplied with curable adhesive binder 28 by trough 30. In this step, kiss roll 26 applies a thin coating of adhesive 28 to flock 24.

Of course, other methods of adhesive application may also be used. Such methods include the use of knife coating, spraying, and the like. Generally, the type of adhesive application means used is dependent upon the viscosity of the adhesive and the amount of adhesive to be applied.

The flock adhesive 28 which is used may be any type of curable adhesive normally used for flocking purposes or which is suitable for adhering raised fibers to a fabric substrate. Such adhesives may be foamed or unfoamed as is well known in the art.

Typically, such adhesives are generally classified as water base, solvent base, or curable liquid systems.

Water base adhesives consist of a binder, generally an emsulsion polymer, and viscosity builder. They may also contain plasticizers, thermosetting resins, curing catalysts, stabilizers, and other additives well known in the art.

The emulsion polymers generally used include acrylic, vinyl-acrylic, vinyl, urethane, and styrene-butadiene latexes. In order, that the flock be held in a desired position until the adhesive is fully cured, it is generally necessary to raise the viscosity of the latex to about 300–300,000 centipoises. The viscosity is dictated by the particular backing being used and the specific adhesive.

When a foamed adhesive is to be used, the viscosity is generally in the range less than about 3,000 centipoises as determined by the Brookfield method with spindle number 6 at 4 rpm. Blow-up ratios for such adhesives are generally in the range from about 1:2 to 1:10, and preferably from 1:2 to 1:5. Methods for foaming adhesives for this use are well known in the art, see for example U.S. Pat. No. 3,607,341, incorporated herein by reference.

Suitable thickeners for use to build viscosity include water soluble polymers, such as carboxymethyl cellulose, hydroxyethyl cellulose, polyoxyethylenes and natural gums as well as alkyl swellable polymers, such as, highly carboxylated acrylic emulsion polymers.

Plasticizers may be added to alter the hand of the finished goods or to improve the flow and levelling characteristics of the adhesive. Where the primary goal is the latter, fugitive plasticizers, such as, the phthalate esters may be employed. If the intent is to alter the hand of the finished goods, then more permanent plasticizers such as low molecular weight polyesters may be used.

Thermosetting resins such as methylol-melamines, urea formaldehyde condensates or phenol formaldehyde condensates may be incorporated to improve durability or abrasion resistance of the finished goods.

Catalysts, such as oxalic acids or diammonium phosphate can be used to increase the rate of cure of the adhesive.

Solvent adhesives include those fully reacted soluble polymers, such as, acrylic homo and copolymers, polyesters, polyamides or polyurethanes and two package systems, such as, polyester polyols with diisocyanates, or isocyanate prepolymers and epoxies with polyamines. The polymer or prepolymer is dissolved in a suitable solvent which is preferably low boiling, and then thickened to the proper viscosity in a manner similar to that used for the water-base adhesives. Catalysts, cross-linking agents, stabilizers, pigments, or dyes may also be incorporated.

Curable liquid systems include 2 part urethanes, e.g., a diisocyanate and a polymeric polyol, flexible epoxy systems, e.g., liquid epoxy resins or solutions of solid epoxy resins co-reacted with polyamides or polyamines and dimercaptans and a polyene with a peroxide. Also, hot melts can be used, such as polyethylene-vinylacetate copolymer, polyethylene-ehylacrylate copolymer, and a plasticized polyvinyl chloride in the form of a plastisol which can be heated to fuse and then cure.

Where a fabric possessing air permeability is desired, a major portion or all of curable adhesive 28 is substantially applied to the very tips of flock fiber 24. In this way, when the substrate backing layer is ultimately married to the auxiliary substrate, flock adhesive 28 will substantially be present only at the fiber tips of flock 24 and at the corresponding point of contact with the substrate backing layer 32, where the flock is bound, thereby imparting breathability to the thus formed fabric.

Where flock adhesive 28 is used in the foamed state, breathability can also be imparted to the fabric by simply coating flock fiber 24 in the conventional manner. Thus, it is not necessary to coat only the very tips of the flock fibers, as described in the above mentioned method, when using a foamed adhesive. This is due to the inherent porosity of the foam which allows for the breathability of the final fabric.

After adhesive 28 has been applied, the partially completed fabric laminate is conveyed to squeeze rolls 38 and 40, where it is married to substrate backing layer 32.

Substrate backing layer 32 may be any type of substrate capable of being used in a textile laminate, such as, woven or non-woven fabrics, foamed or unfoamed plastics, paper and the like. Typically, suitable flexible substrates include polyvinyl and urethane films, fabrics composed of cellulose-based fabrics, e.g., rayon or cotton, and synthetic and natural fibers such as nylon, polyester, wool, mohair, silk, acrylics, modacrylics, and blends thereof. In particular, however, in accordance with the present invention, fabric materials which are impossible or difficult to flock or nap are particularly applicable to being used as the substrate backing layer in the present invention.

Fabrics which are inherently porous or dimensionally unstable, e.g., knits or coarsely woven material, particularly so-called "silver knit" fabrics cannot effectively be flocked without also destroying the fabric or creating a very boardy hand. Further, these fabrics do not lend themselves to napping as a substitute for flocking for it is extremely difficult, if not impossible, to nap such a fabric without also destroying it. Thus, one of the important advantages of the present invention is the fact that such fabrics, which heretofore have not been used effectively as a substrate backing layer in a flocked laminate, can now be so used.

Squeeze rolls 38 and 40 do not exert any substantial pressure on the laminate, but are simply sufficiently close together to maintain the fabric and the auxiliary sheets substantially next to one another.

The laminate is then conveyed to curing box 42, which may be a conventional design where the adhesive 28 is set or cured. This is usually accomplished by heating or subjecting the binder to ultra-violet irridation for a period of time sufficient to fix the binder.

After exiting the curing box 42, the auxiliary substrate 14 is separated and stripped from the completed flocked fabric 44 leaving the flock 24 secured to the substrate backing layer 32. As can be seen, it is important that the curable flock adhesive binder 28 possess a greater affinity for the flock than the temporary adhesive binder 20. Thus, while it is the purpose of the temporary adhesive binder to merely retain the flock on the auxiliary substrate in order to carry it through the process, it is the purpose of the curable adhesive binder to be later cured so as to secure the flock or raised fibers permanently to the substrate backing layer.

As shown in FIG. 1, the auxiliary substrate 14 is wound onto roll 46 for disposal or possible reuse and the finished flocked fabric is wound onto roll 48.

Figure 2:
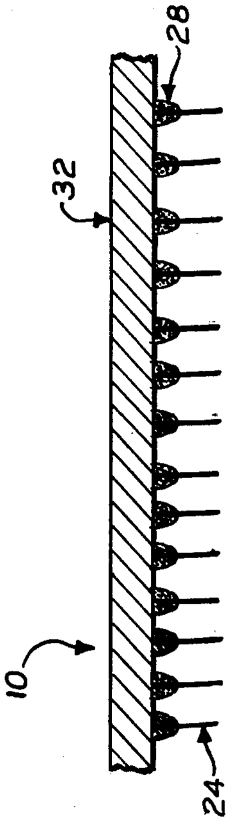
FIG. 2, is an enlarged cross-sectional representation of the flocked fabric of the invention taken along line 2—2 of FIG. 1 after the removal of the auxiliary substrate from the fabric laminate.

Referring now to FIG. 2, there is shown an enlarged representation of a cross-section of the flocked fabric laminate taken along line 2—2 of FIG. 1, i.e., after auxiliary substrate 14 has been removed and stripped from the final laminate. FIG. 2 represents an embodiment of the invention wherein the fabric shown possesses air permeability.

Thus, as shown in FIG. 2, the laminate represented generally as 10, has a bottom substrate layer 32, which may be of a kind which heretofore could not have been flocked, a facing layer of flocked fibers 24, and a discontinuous adhesive binder interlayer 28, securing the flocked fibers to the substrate.

From FIG. 2, it is seen that flock adhesive 28 is present only at the fiber tips of flock 24 and at the corresponding point of contact with bottom substrate layer 32, where the flock is bound. This produces a discontinuous flock adhesive layer wherein substantially all of the flock adhesive is present only at the tips of the flock fibers. This results in the fabric remaining porous and air permeable and contributes to a better aesthetic hand of the fabric as a result thereof.

It is understood, of course, that the present invention can also be practiced by applying the flock adhesive in a substantially continuous layer over the flocked fibers resulting in a laminate which does not, however, possess the breathability and porosity that is present when applying the adhesive only to the fiber tips of the flock.

The following examples further illustrate the present invention:

EXAMPLE 1

An inexpensive cotton auxiliary substrate was coated with a gum, gum arabic, for use as a temporary adhesive. The coated substrate was then flocked in a beater bar unit with 1mm. rayon flock and then dried at 130° C. for 10 minutes.

The flock surface of the flocked substrate was then coated with a conventional, permanent acrylic flock binder having a viscosity of 180,000 cps. to a wet lay-down of 15 mils. A rayon fabric was then laminated to the coated flock surface. The laminate was dried at 80° C. for 15 minutes and cured at 150° C. for 10 minutes. The cotton substrate then was stripped leaving the flock firmly anchored to the rayon fabric.

EXAMPLE 2

Example 1 was repeated, except, paper was used as the auxiliary substrate instead of the cotton substrate. The paper substrate was stripped leaving the flock firmly anchored to the rayon fabric.

EXAMPLE 3

Example 1 was repeated, except, ground nylon was used in place of the 1mm. rayon flock.

EXAMPLE 4

Example 1 was repeated, except, Sorbitol was used as the temporary binder.

EXAMPLE 5

Paper was coated with starch as a temporary flock binder. The coated paper was flocked with 1mm. colored rayon flock and was then dried at 150° C. for 5 minutes.

The flock surface of the flocked paper was coated with an aqueous urethane binder having a viscosity of 200,000 cps. to a wet lay-down of 10 mils. A cotton fabric was laminated to the coated flock surface. The laminate was dried at 100° C. for 10 minutes and cured at 150° C. for 10 minutes. The paper was then stripped from the laminate wherein the colored flock was permanently anchored to the cotton fabric.

EXAMPLE 6

Example 5 was repeated, except, a conventional acrylic binder was used as the permanent flock binder. In this case, however, the binder was foamed on a Hobart foamer to a 3:1 blow ratio prior to coating.

The resulting flocked fabric was found to be breathable.

EXAMPLE 7

Paper was coated with a conventional gum. The coated fabric was flocked with 1.5mm. acrylic flock and was then dried at 130° C. for 5 minutes.

The flock surface of the flocked paper was coated with a plastisol/acrylic blend to a wet lay-down of 10 mils. A knit fabric was laminated to the coated flock surface. The laminate was dried and cured. The paper was then stripped from the laminate wherein the flock was permanently anchored to the knit fabric.

EXAMPLE 8

Paper was coated with a gum via knife over roll to a wet lay-down of 3 mils. The coated paper was then flocked on a beater bar unit with ground cotton and was then dried at 150° C. for 2 minutes.

The flock surface was then coated with a conventional acrylic binder possessing a viscosity of 200,000 cps. to a wet lay-down of 40 mils. via knife over roll. A silver knit was then laminated to the coated flock surface. The laminate was then dried at 130° C. for 15 minutes. The paper was then stripped from the laminate.

The resulting product possessed the appearance of sheep-skin on one side and the look and feel of suede on the opposite side.

Variations and modifications may, of course, be made, without departing from the spirit and scope of the present invention.

Having thus described our invention, what we desire to secure by Letters Patent is:

1. An air permeable laminate comprising:
a. a substrate backing layer;
b. a facing layer of flock fibers; and
c. an adhesive binder interlayer securing the flock fibers to the substrate, a major portion of the binder being present substantially at the tips of the flock fibers and at the corresponding point of contact on the substrate layer to which the flock fibers are secured.

2. A method for preparing an air permeable flocked fabric laminate of the type composed of a substrate backing layer, a facing layer of flock fibers, and an adhesive binder interlayer securing the flock fibers to the substrate comprising:
a. coating an auxiliary substrate with a temporary adhesive binder;
b. flocking the coated auxiliary substrate with flock fibers;
c. coating the tips of the flock fibers with a curable flock adhesive binder such that the binder is located only at the tips of the individual fibers;
d. marrying the substrate backing layer to the coated tips of the flock fibers;
e. permanently setting the curable flock adhesive binder; and
f. removing the auxiliary substrate from the fabric laminate.

3. The method of claim 2 wherein the flock fibers are flocked onto the coated auxiliary substrate in a substantially upstanding position.

4. The method of claim 2 wherein the auxiliary substrate material is selected from the group consisting of paper, plastic, fabric and metallic foil.

5. The method of claim 2 wherein the temporary adhesive binder is selected from the group consisting of wax, polyethylene, polystrene, starch based adhesives, gums and water soluble non-curing polymers.

6. The method of claim 2 wherein the flock fibers are composed of materials selected from the group consisting of rayon, cotton, nylon, polyesters, wool, mohair, silk, acrylics, modacrylics, natural and synthetic fibers, and blends thereof.

7. The method of claim 2 wherein the curable flock adhesive is selected from the group consisting of urethane, vinyl, neoprene, acrylic, vinyl-acrylic, and styrene-butadiene latexes and polyester, polyamide and polyurethane solvent adhesives.

8. The method of claim 2 wherein the substrate backing layer is a woven, knitted, or non-woven fabric.

9. The method of claim 2 wherein the substrate backing layer is a silver knit fabric.

10. The method of claim 2 wherein the substrate backing layer is selected from the group consisting of natural and synthetic fibers, rayon, cotton, nylon, polyesters, wool, mohair, silk, acrylics, modacrylics, and blends thereof.

11. The product obtained by the method of claim 2.

12. A method for preparing a breathable flocked fabric laminate of the type composed of a substrate backing layer, a facing layer of flock fibers and an adhesive binder inter-layer securing the flock fibers to the substrate comprising:
a. coating an auxiliary substrate with a temporary adhesive binder;
b. flocking the coated auxiliary substrate with flock fibers such that the fibers are in a substantially upstanding position;
c. coating a curable flock adhesive binder on the tips of the upstanding flock fibers such that the binder is located only at the tips of the individual fibers;
d. marrying the substrate backing layer to the coated tips of the flock fibers;
e. permanently setting the curable flock adhesive binder; and
f. removing the auxiliary substrate from the fabric laminate.

13. A method for preparing an air permeable flocked fabric laminate of the type composed of a substrate backing layer, a facing layer of flock fibers and an adhesive binder interlayer securing the flock fibers to the substrate comprising:
a. coating an auxiliary substrate with a temporary adhesive binder;
b. flocking the coated auxiliary substrate with flock fibers such that the fibers are in a substantially upstanding position;
c. coating the tips of the flock fibers with a foamed curable flock adhesive binder such that, when cured, the binder is located only at the tips of the individual fibers;
d. marrying the substrate backing layer to the coated tips of the flock fibers;
e. permanently setting the curable flock adhesive binder; and
f. removing the auxiliary substrate from the fabric laminate.

14. The product obtained by the method of claim 13.

* * * * *